(12) United States Patent
Neuman et al.

(10) Patent No.: US 11,851,944 B2
(45) Date of Patent: Dec. 26, 2023

(54) VARIABLY TRANSMISSIVE WINDOW WITH TUNABLE DYNAMIC RANGE

(71) Applicant: GENTEX CORPORATION, Zeeland, MI (US)

(72) Inventors: George A. Neuman, Holland, MI (US); Mario F. Saenger Nayver, Zeeland, MI (US); John S. Anderson, Holland, MI (US); David M. Ellis, Holland, MI (US); Matthew A. Koppey, Holland, MI (US); Stephen F. Richlich, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 317 days.

(21) Appl. No.: 17/190,817

(22) Filed: Mar. 3, 2021

(65) Prior Publication Data
US 2021/0277711 A1 Sep. 9, 2021

Related U.S. Application Data

(60) Provisional application No. 62/984,986, filed on Mar. 4, 2020.

(51) Int. Cl.
*E06B 9/24* (2006.01)
*G02F 1/17* (2019.01)
(Continued)

(52) U.S. Cl.
CPC ............ *E06B 9/24* (2013.01); *B32B 17/1022* (2013.01); *B32B 17/10036* (2013.01);
(Continued)

(58) Field of Classification Search
CPC .......... B32B 17/10036; B32B 17/1022; B32B 17/10495; B32B 17/10504;
(Continued)

(56) References Cited

U.S. PATENT DOCUMENTS 5,724,177 A * 3/1998 Ellis, Jr. ................. G02F 1/157
359/275
6,239,898 B1 5/2001 Byker et al.
(Continued)

*Primary Examiner* — Mariam Qureshi
(74) *Attorney, Agent, or Firm* — Price Heneveld LLP; Brian James Brewer

(57) ABSTRACT

A variably transmissive electro-optic window that has an easily tunable dynamic range is disclosed. The window comprises a first substrate, a second substrate, a first electrode, a second electrode, an electro-optic medium, and at least one tuning layer. The first substrate has a first and a second surface. The first surface is in a first direction relative the second surface. The second substrate has a third and a fourth surface. The third surface is disposed in the first direction relative the fourth surface. The second substrate is disposed in a second direction opposite the first direction relative the first substrate. The second substrate is additionally disposed in a substantially parallel and spaced apart relationship with the first substrate. The first electrode is disposed in the second direction relative the first substrate. The second electrode is disposed in the first direction relative the second substrate. The electro-optic medium is disposed between the first and second electrodes. Additionally, the electro-optic medium is operable to vary a transmittance of light therethrough. Lastly, a tuning layer is substantially transparent and operable to attenuate the transmittance of visible light therethrough.

1 Claim, 2 Drawing Sheets

(51) Int. Cl.
    *G02F 1/157*     (2006.01)
    *G02F 1/1335*    (2006.01)
    *B32B 17/10*     (2006.01)
    *E06B 3/67*      (2006.01)

(52) U.S. Cl.
    CPC ...... *B32B 17/10495* (2013.01); *E06B 3/6722* (2013.01); *G02F 1/133502* (2013.01); *G02F 1/157* (2013.01); *G02F 1/172* (2013.01); *B32B 2307/412* (2013.01); *E06B 2009/2464* (2013.01)

(58) Field of Classification Search
    CPC ........ B32B 17/10513; B32B 17/10532; B32B 2307/412; E06B 2009/2464; E06B 3/6722; E06B 9/24; G02F 1/133502; G02F 1/157; G02F 1/172
    See application file for complete search history.

(56) References Cited

U.S. PATENT DOCUMENTS

2015/0177585 A1* 6/2015 Ding .................... G02F 1/1524
                                                        359/275
2018/0323362 A1* 11/2018 Schwede .............. H10N 10/851

\* cited by examiner

VARIABLY TRANSMISSIVE WINDOW WITH TUNABLE DYNAMIC RANGE

CROSS-REFERENCE TO RELATED APPLICATIONS

This application claims priority under 35 U.S.C. § 119(e) to U.S. Provisional Application No. 62/984,986 filed on Mar. 4, 2020, entitled "DIMMING WINDOW WITH TUNABLE DYNAMIC RANGE," the disclosure of which is hereby incorporated by reference in its entirety.

FIELD OF INVENTION

The present disclosure generally relates to a window element and, more particularly, to a window element that is variably transmissive.

BACKGROUND OF INVENTION

Electro-optic elements have been well known for many years. The use of electro-optic elements in windows has the advantage of allowing the window to be variably transmissive or, in other words, variably dimmed. However, various applications may be better served by variably transmissive windows with different dynamic ranges. Accordingly, there is a need for an improved window element that provides a tunable dynamic range.

SUMMARY

In accordance with the present disclosure, the disadvantages and problems associated with tuning the dynamic range of electro-optic elements have been substantially reduced or eliminated.

According to one aspect of this disclosure, a window is disclosed. The window may comprise a first substrate, a second substrate, a first electrode, a second electrode, an electro-optic medium and a tuning layer. The first substrate may have a first surface and a second surface. The first surface may be disposed in a first direction relative the second surface. Similarly, the second substrate may have a third surface and a fourth surface. Further, the second substrate may be disposed in a substantially parallel and spaced apart relationship in the second direction relative the first substrate. The second direction may be opposite the first direction. The third surface may be disposed in the first direction relative the fourth surface. The first electrode may be disposed in the second direction relative the first substrate. The second electrode may be disposed in the first direction relative the second substrate. The electro-optic medium may be disposed between the first electrode and the second electrode. The electro-optic medium may be operable to vary a transmittance of light therethrough. The tuning layer may be substantially transparent and operable to attenuate the transmittance of visible light therethrough. The tuning layer may comprise at least one of a metal, semi-metal, semi-conductor, metal oxide, metal nitride, or metal oxynitride. In some embodiments, the tuning layer may comprise at least one of chrome, molybdenum, or ruthenium. Thus, the tuning layer may be operable to attenuate the transmittance of visible light therethrough from between 70 and 45 percent. Further, in some embodiments, the tuning layer may have an emissivity less than 0.5.

In some embodiments, the tuning layer may be disposed in the first direction relative the first substrate. In some such embodiments, the tuning layer may be in abutting contact with the first surface. Additionally or alternatively, the window may further comprise a third substrate. The third substrate may be disposed in a substantially parallel and spaced apart relationship in the first direction relative the first substrate. Accordingly, in some such embodiments, the tuning layer may be disposed in the second direction relative the third substrate. In other such embodiments, the tuning layer may be disposed in the first direction relative the third substrate.

In other embodiments, the tuning layer may be disposed in the second direction relative the first substrate and in the first direction relative the electro-optic medium. In some such embodiments, the tuning layer may be further disposed in first direction relative the electro-optic medium. In other such embodiments, the tuning layer may be further disposed in in the second direction relative the first electrode.

In yet other embodiments, the tuning layer may be disposed in the first direction relative the second substrate and the second direction relative the electro-optic medium. In some such embodiments, the tuning layer may be further disposed in the first direction relative the second electrode. In other such embodiments, the tuning layer may be further disposed in the second direction relative the second electrode.

In yet other embodiments, the tuning layer may be disposed in the second direction relative the second substrate. In some such embodiments, the tuning layer may be disposed in abutting contact with the fourth surface.

In some embodiments, the window may further comprise a third substrate and a fourth substrate. The third substrate may be disposed in a substantially parallel and spaced apart relationship in the first direction relative the first substrate. The fourth substrate may be disposed in a substantially parallel and spaced apart relationship in the second direction relative the second substrate. In such an embodiment, the tuning layer may be disposed in the first direction relative the first substrate. Further, the tuning layer may be disposed in the first or second directions relative the third substrate. Additionally or alternatively, the tuning layer may be disposed in the second direction relative the second substrate and the first or second directions relative the fourth substrate.

Some aspects of the present disclosure may have the advantage of an easily tunable dynamic range without otherwise requiring a change to the construction of the window. Further, specific embodiments of the tuning layer may have the advantage of being low in cost, compatible with manufacturing steps already used in the construction of the window, variably adjustable in in transmittance level and not confined to specific quantum levels, compatible with the electro-optic medium, durable, color neutral, low in visible reflectance, high in reflecting solar energy, reduced in sheet resistance associated with the first electrode and/or second electrode, and/or reduced in reflectance associated with the first electrode and/or the second electrode.

Additionally, in some embodiments, the tuning layer, by attenuating the transmittance of visible light therethrough, may enable a lower electro-optic medium concentration to achieve a similar low transmittance value for the dynamic range, since transmittance of light through the electro-optic medium may be proportional to its concentration. Windows with lower electro-optic medium concentrations may have the advantage of improved transmittance uniformity across the window. Imperfections in the second and third surfaces may result in non-perfectly planar surfaces. Additionally, the first and second substrates may be disposed in a non-perfectly parallel fashion. As a result of these imperfections, the spacing between the first and second substrates may vary from point to point across the window element. Differences in spacing at various points means that light traveling there though at these various points travel through different amounts of the electro-optic medium and are accordingly dimmed by different amounts. These differences in transmission based on location across the window may be less noticeable when the electro-optic medium is of a lower concentration. Accordingly, the addition of the one or more tuning layer has the advantage of increasing the uniformity of transmission across the window element.

These and other aspects, objects, and features of the present disclosure will be understood and appreciated by those skilled in the art upon studying the following specification, claims, and appended drawings. It will also be understood that features of each embodiment disclosed herein may be used in conjunction with, or as a replacement for, features in other embodiments.

DETAILED DESCRIPTION

For the purposes of description herein, the specific devices illustrated in the attached drawings and described in this disclosure are simply exemplary embodiments of the inventive concepts defined in the appended claims. Hence, specific dimensions and other physical characteristics relating the embodiments disclosed herein are not limiting, unless the claims expressly state otherwise.

The present disclosure is directed to a variably transmissive window having a tunable dynamic range. For example, different high-end and low-end transmittance values may be achieved. To achieve different dynamic ranges for variably transmissive windows, the construction of the window previously required significant changes. For example, electro-optic medium compositions, substrate compositions, and spacings between substrates would need to be changed from one window model to the next. Such changes lead to a significant increase in required research and development to find a suitable construction for a given dynamic range as well as a significant increase in manufacturing costs due to process changes. However, the present disclosure provides for a variably transmissive window having a tuning layer which may be varied to tune the dynamic range of the variably transmissive window without otherwise requiring a change to the window construction.

Figure 1:
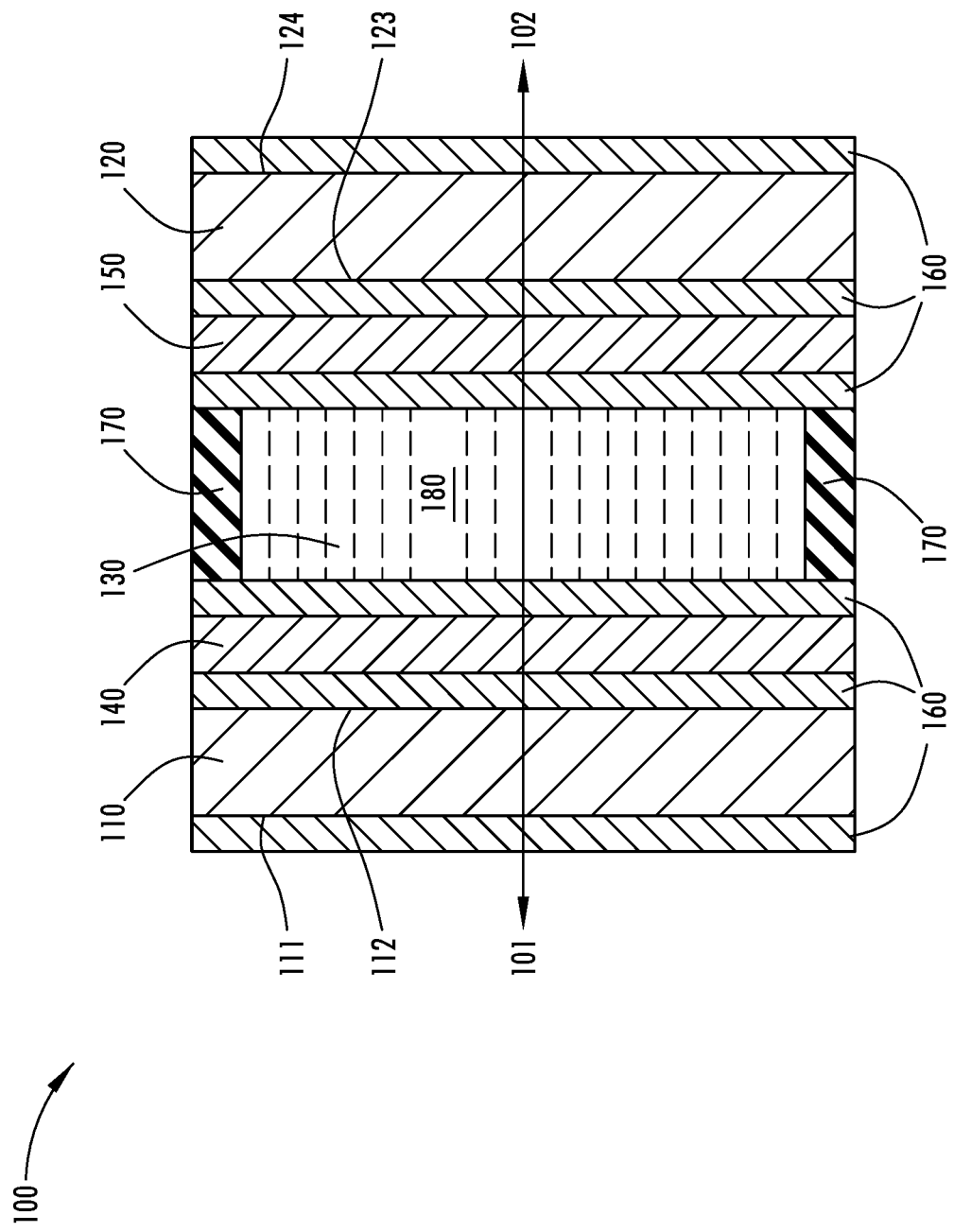
FIG. 1: A cross sectional schematic representation of a window element.

FIG. 1 is a cross-sectional schematic representation of a window element 100. Window element 100 may serve as a barrier between an exterior region in a first direction 101 and an interior region in a second direction 102. Further, window element 100 is an element operable to vary the transmittance of light therethrough. Accordingly, window element 100 may be an electro-optic element. Window element 100 may comprise a first substrate 110, a second substrate 120, an electro-optic medium 130, a first electrode 140, a second electrode 150, one or more tuning layer 160, and/or a seal 170

First substrate 110 comprises a first surface 111 and a second surface 112. First surface 111 is disposed in the first direction 101 relative second surface 112. Further, first substrate 110 may be fabricated from any one of a number of materials that are transparent or substantially transparent in the visible region of the electromagnetic spectrum, such as borosilicate glass, soda lime glass, float glass, natural and synthetic polymeric resins, plastics, and/or composites including Topas®, which is commercially available from Ticona of Summit, N.J. While particular substrate materials are disclosed, for illustrative purposes only, other materials known in the art may be used. In some embodiments, first substrate 110 may have a thickness greater than or equal to approximately 0.05, 0.125, 0.5, 1.0, 1.1, 1.6, or 2.2 mm.

Second substrate 120 is disposed in the second direction 102, substantially parallel, and in a spaced apart relationship relative first substrate 110. Additionally, second substrate 120 comprises a third surface 123 and a fourth surface 124. Third surface 123 is disposed in the first direction 101 relative fourth surface 124. Further, second substrate 120 may be fabricated from similar materials as that of first substrate 110.

Electro-optic medium 130 is disposed between first substrate 110 and second substrate 120. Additionally, electro-optic medium 130 may be an electrochromic medium, a liquid crystal medium, or a suspended particle medium. Accordingly, electro-optic medium 130 may be operable to vary a transmittance of light through window element 100 at one or more wavelengths. The variance in transmittance may occur at one or more wavelengths in the visible region of the electromagnetic spectrum. The variance in transmittance may additionally or alternatively occur in other regions of the electromagnetic spectrum. For example, the variance may occur in the ultra-violet or near infra-red regions. In response to an electrical potential or field applied thereto, electro-optic medium 130 may be variably activated. A change in activation may correspond to the change in transmittance.

First electrode 140 is an electrically conductive material. The electrically conductive material may be substantially transparent in the visible region of the electromagnetic spectrum and generally resistant to corrosion from the materials of window element 100 with which it makes contact, such as, first substrate 110, second substrate 120, electro-optic medium 130, and/or tuning layer 160. For example, the electrically conductive material may be a transparent conductive oxide (TCO) such fluorine doped tin oxide (FTO), indium tin oxide (ITO), or indium zinc oxide (IZO). Other suitable materials include IMI or metal mesh electrodes. In some embodiments, first electrode 140 may be about 0.05, 0.015, 0.3, 0.5, 0.9, 1.0, 1.1, 1.2, 1.3, 1.4, or 1.5 microns thick. Further, first electrode 140 may be disposed in the second direction 102 relative first substrate 110 and the first direction 101 relative electro-optic medium 130. In some embodiments, first electrode 140 may be disposed in abutting contact with second surface 112. Accordingly, first electrode 140 may be disposed on second surface 112.

Second electrode 150 is likewise an electrically conductive material. Further, the electrically conductive material of second electrode 150 may be of the same materials suitable for first electrode 140. Additionally, second electrode 150 may be disposed in the first direction 101 relative second substrate 120 and the second direction 102 relative electro-optic medium 130. In some embodiments, second electrode 140 may be disposed in abutting contact with third surface 123. Accordingly, second electrode 150 may be disposed on third surface 123.

Tuning layer 160 may be a material operable to attenuate the transmittance of visible light therethrough, while still remaining substantially transparent. For example, tuning layer 160 may be a metal, semi-metal, semi-conductor, metal oxide, metal nitride, or metal oxynitride. In some embodiments, tuning layer 160 may be composed of chrome, molybdenum, or ruthenium. Tuning layer 160 may have a thickness of approximately 50, 40, 30, 20, 10, 4.0, 3.0, 2.0, 1.5, or 1.0 nm. Further, tuning layer 160 may have a high or a low emissivity property. The emissivity may be less than, equal to, or greater than about 0.1, 0.2, 0.3, 0.4, 0.5, 0.6, 0.7, 0.8, or 0.9. Additionally, tuning layer 160 may have a reflectance of less than or equal to about 20, 15, 10, or 5 percent.

Tuning layer 160 may be disposed in a number of locations. In some embodiments, tuning layer 160 may be disposed in the first direction 101 relative first substrate 110. Accordingly, tuning layer 160 may be associated with first surface 111. Further, tuning layer 160 may be in abutting contact with first surface 111.

In other embodiments, tuning layer 160 may be disposed in the second direction 102 relative first substrate 110 and in the first direction 101 relative electro-optic medium 130. Accordingly, tuning layer 160 may be associated with second surface 120. Further, tuning layer 160 may be disposed in abutting contact with second surface 112. Thus, tuning layer 160 may further be disposed in the first direction 101 relative first electrode 140. Alternatively, tuning layer 160 may be disposed in the second direction 102 relative first electrode 140. Accordingly, tuning layer 160 may be disposed in abutting contact with first electrode 140 and/or electro-optic medium 130.

In yet other embodiments, tuning layer 160 may be disposed in the first direction 101 relative second substrate 120 and in the second direction 102 relative electro-optic medium 130. Accordingly, tuning layer 160 may be associated with third surface 123. Further, tuning layer 160 may be disposed in abutting contact with third surface 123. Thus, tuning layer 160 may further be disposed in the second direction 102 relative second electrode 150. Alternatively, tuning layer 160 may be disposed in the first direction 101 relative second electrode 150. Accordingly, tuning layer 160 may be disposed in abutting contact with second electrode 150 and/or electro-optic medium 130.

In yet other embodiments, tuning layer 160 may be disposed in the second direction 102 relative second substrate 120. Accordingly, tuning layer 160 may be associated with fourth surface 124. Further, tuning layer 160 may be in abutting contact with fourth surface 124.

Seal 170 is disposed between two or more of first substrate 110, second substrate 120, first electrode 140, second electrode 150, and one or more tuning layer 160 in a peripheral manner to define a chamber 180. Chamber 180 contains electro-optic medium 130. Alternatively, seal 170 may be disposed about and extend between the peripheries of first substrate 110 and second substrate 120 to define chamber 180. Seal 170 may comprise any material of being adhesively bonded to the elements with which it defines chamber 180, to in turn seal chamber 180.

Figure 2:
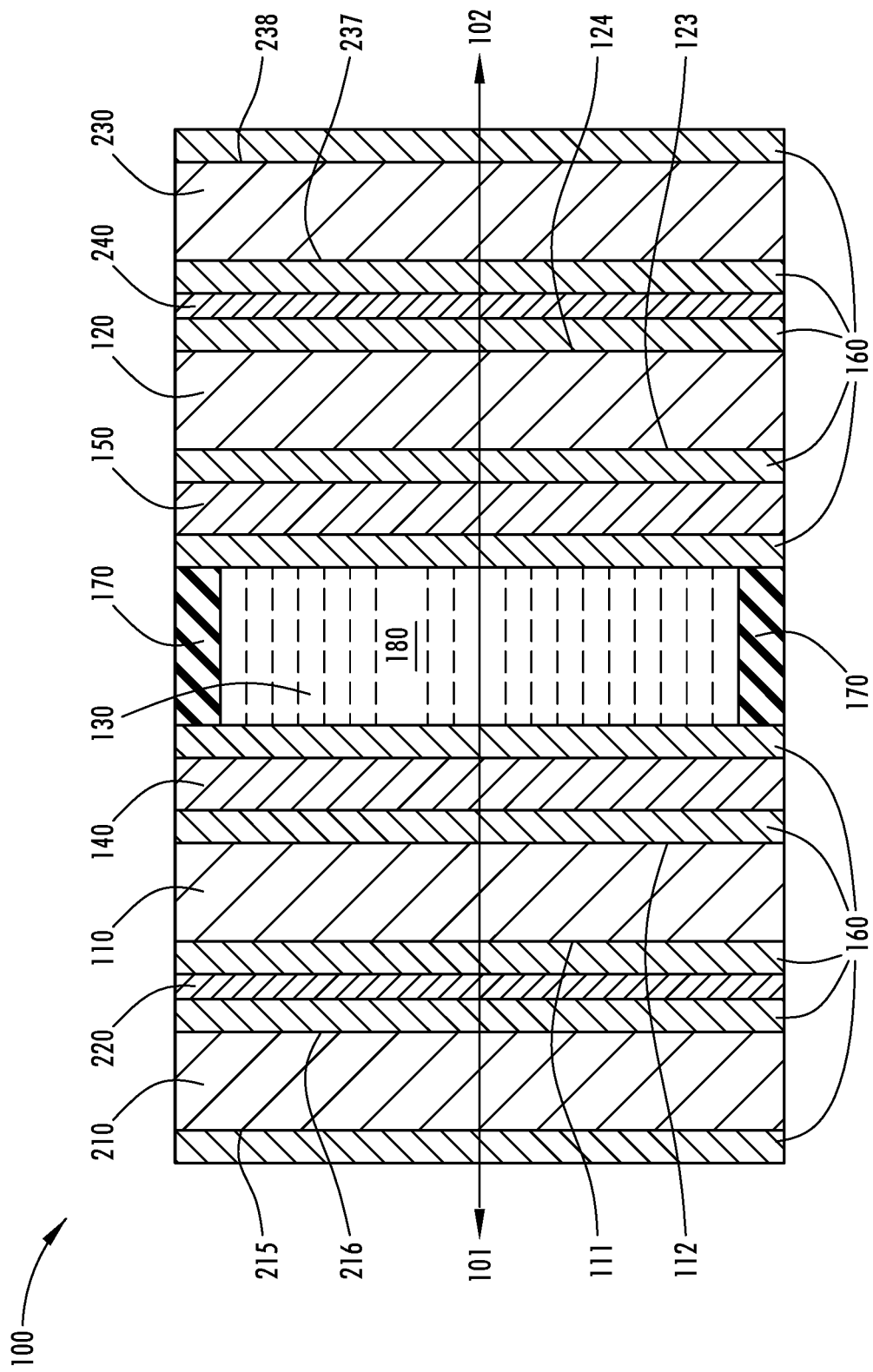
FIG. 2: A cross sectional schematic representation of a window element with additional lamination layers.

In some embodiments, window element 100, as shown in FIG. 2, may contain laminations to enhance the physical properties of window element 100, such as breaking strength. Accordingly, window element 100 may further comprise a third substrate 210, a first coupling agent 220, a fourth substrate 230, and/or a second coupling agent 240.

Third substrate 210 is disposed in the first direction 101, substantially parallel, and in a spaced apart relationship relative first substrate 110. Additionally, third substrate 210 comprises a fifth surface 215 and a sixth surface 216. Fifth surface 215 is disposed in the first direction 101 relative sixth surface 216. Further, third substrate 210 may be fabricated from similar materials as that of first substrate 110.

In embodiments where window element 100 further comprises third substrate 210, tuning layer 160 may be disposed in additional locations. In some embodiments, tuning layer 160 may be disposed in the first direction 101 relative third substrate 210. Accordingly, tuning layer 160 may be associated with fifth surface 215. Further, tuning layer 160 may be disposed in abutting contact with fifth surface 215. In other embodiments, tuning layer 160 may be disposed in the second direction 102 relative third substrate 210 and in the first direction 101 relative first substrate 110. Accordingly, tuning layer 160 may be associated with sixth surface 216. Further, tuning layer 160 may be disposed in abutting contact with sixth surface 216.

First coupling agent 220 is disposed between first substrate 110 and third substrate 210. First coupling agent 220 is an adhesive operable to adhere two of first substrate 110, one or more tuning layer 160, and third substrate 210 together. Additionally, first coupling agent 220 may be substantially transparent in the visible region of the electromagnetic spectrum. For example, first coupling agent 220 may comprise ethylene vinyl acetate ("EVA"); polyvinyl butyral ("PVB"); thermoplastic urethane ("TPU"); substantially transparent epoxy, such as OE1582 commercially available from United Adhesives, Inc.; acrylic; or silicone, such as but not limited to the acrylic 8146-2 Optically Clear Adhesive from 3M®, which may be a film, adhesive.

Fourth substrate 230 is disposed in the second direction 102, substantially parallel, and in a spaced apart relationship relative second substrate 120. Additionally, fourth substrate 230 comprises a seventh surface 237 and an eighth surface 238. Seventh surface 237 is disposed in the first direction 101 relative eighth surface 238. Further, fourth substrate 230 may be fabricated from similar materials as that of first substrate 110.

In embodiments where window element 100 further comprises fourth substrate 230, tuning layer 160 may be disposed in additional locations. In some embodiments, tuning layer 160 may be disposed in the first direction 101 relative fourth substrate 230 and in the second direction 102 relative second substrate 150. Accordingly, tuning layer 160 may be associated with seventh surface 237. Further, tuning layer 160 may be disposed in abutting contact with seventh surface 237. In other embodiments, tuning layer 160 may be disposed in in the second direction 102 relative fourth substrate 230. Accordingly, tuning layer 160 may be associated with eighth surface 238. Further, tuning layer 160 may be disposed in abutting contact with eighth surface 238.

Second coupling agent 240 is disposed between second substrate 120 and fourth substrate 230. Further, second coupling agent 240 is an adhesive operable to adhere two of first substrate 110, one or more tuning layer 160, and fourth substrate 230 together. Additionally, second coupling agent 240 may be substantially transparent in the visible region of the electromagnetic spectrum. Accordingly, second coupling agent 240 may be comprised of similar materials as that of first coupling agent 220.

In some embodiments, window element 100 may have a reflectance of light traveling in the first and/or second direction 101, 102 of less than or equal to about 20, 18, 15, 13, 10, 9, 8, 7, 6, 5, 4, 3, 2, or 1 percent. Additionally, tuning layers 160 in an embodiment of window element 100 may attenuate the transmittance of light therethrough by greater than or equal to about 90, 85, 80, 75, 70, 65, 60, 55, 50, 45, 40, 35, 25, 15, 10 or 5 percent.

In operation, window element 100 is variably transmissive with respect to visible light transmitting therethrough. The first and second electrodes 140, 150 may apply and/or change an electrical potential or field to electro-optic medium 130 in order to variably activate electro-optic medium 130. Since the activation of electro-optic medium 130 may correspond to a change in transmittance, window element 100 may be variably transmissive.

Further, the transmittance of window element 100 when electro-optic medium 130 is in activated and un-activated states determines a dynamic range of window element 100. However, this dynamic range may be tuned by varying the number of, placement of, thickness of, and composition of tuning layer 160.

Accordingly, window element 100 has the advantage of an easily tunable dynamic range without otherwise requiring a change to the construction of window element 100. Embodiments of tuning layer 160 may have the advantage of being low in cost, compatible with manufacturing steps already used in the construction of window element 100, variably adjustable in in transmittance level and not confined to specific quantum levels, compatible with electro-optic medium 130, durable, color neutral, having a low visible reflectance, reflecting solar energy, reduced sheet resistance associated with first electrode 140 and/or second electrode 150, and/or reduced reflectance associated with first electrode 140 and/or second electrode 150.

Additionally, in some embodiments, tuning layer 160, by attenuating the transmittance of visible light therethrough, may enable a lower electro-optic medium 130 concentration to achieve a similar low transmittance value for the dynamic range, since transmittance of light through electro-optic medium 130 may be proportional to its concentration. Window elements 100 with lower electro-optic medium 130 concentrations have the advantage of improved transmittance uniformity across window element 100. Imperfections in the second and third surfaces 112, 123 may result in non-perfectly planar surfaces. Additionally, the first and second substrates 110, 120 may be disposed in a non-perfectly parallel fashion. As a result of these imperfections, the spacing between the first and second substrates 110, 120 may vary from point to point across window element 100. Differences in spacing at various points means that light traveling there though at these various points travel through different amounts of electro-optic medium 130 and are accordingly dimmed by different amounts. These differences in transmission based on location across window element 100 are less noticeable when electro-optic medium 130 is of a lower concentration. Accordingly, the addition of one or more tuning layer 160 has the advantage of increasing the uniformity of transmission across a window element 100.

EXAMPLES

The affect of tuning layer 160 may be seen the following examples. In a first example of window element 100, window element 100 has a first substrate 110, a second substrate 120, an electro-optic medium 130, a first electrode 140, and a second electrode 150. First substrate 110 comprises a first surface 111 and a second surface 112. The first surface 111 is disposed in a first direction 101 relative the second surface 112. Further, first substrate 110 is made of 1 mm thick clear glass. Second substrate 120 is disposed in a second direction 102, substantially parallel, and in a spaced apart relationship relative first substrate 110. The second direction 102 is substantially opposite the first direction 101. Additionally, second substrate 120 comprises a third surface 123 and a fourth surface 124. Third surface 123 is disposed in the first direction 101 relative fourth surface 124. Further, second substrate 120 is, likewise, made of 1 mm think clear glass. Electro-optic medium 130 is disposed between first substrate 110 and second substrate 120. Further, electro-optic medium 130 has a thickness of 500 microns. First electrode 140 is associated with second surface 112, between first substrate 110 and electro-optic medium 130. Further, first electrode 140 is made of 1.3 micron thick ITO. Second electrode 150 is associated with third surface 123, between second substrate 120 and electro-optic medium 130. Additionally, second electrode 150 is made of 1.3 micron thick ITO. This baseline construction may have an exterior reflectance of 8.9%, an interior reflectance of 8.9%, and a transmittance of 55.7%.

In some embodiments, to the baseline construction, outlined above, a tuning layer 160 is associated with the first surface 111. Further, tuning layer 160 is a 3 nm thick layer of chrome. In such an embodiment, this construction may have an exterior reflectance of 19.9%, an interior reflectance of 8.3%, and a transmittance of 30.8%.

In other embodiments, to the baseline construction outlined above, a tuning layer 160 is associated with the fourth surface 124. Additionally, tuning layer 160 is a 1.5 nm thick layer of chrome. In such an embodiment, this construction may have an exterior reflectance of 7.7%, an interior reflectance of 13%, and a transmittance of 40.6%.

In yet other embodiments, to the baseline construction outlined above, tuning layers 160 are associated with the second and third surfaces 112, 123. The tuning layer 160 associated with the second surface 112 is disposed in the first direction 101 relative electro-optic medium 130 and in the second direction 102 relative first electrode 140. Similarly, the tuning layer 160 associated with the third surface 123 is disposed in the second direction 102 relative electro-optic medium 130 and in the first direction 101 relative second electrode 150. Additionally, the tuning layers 160 are 1.0 nm thick layers of ruthenium. In such an embodiment, this construction may have an exterior reflectance of 8%, an interior reflectance of 8%, and a transmittance of 34.7%.

In yet other embodiment, to the baseline construction outlined above, tuning layers 160 are associated with the second and third surfaces 112, 123. The tuning layer 160 associated with the second surface 112 is disposed in the first direction 101 relative electro-optic medium 130 and in the second direction 102 relative first electrode 140. Similarly, the tuning layer 160 associated with the third surface 123 is disposed in the second direction 120 relative electro-optic medium 130 and in the first direction 101 relative second electrode 150. Additionally, the tuning layers 160 are 2 nm thick layers of ruthenium. In such an embodiment, this construction may have an exterior reflectance of 9.1%, an interior reflectance of 9.1%, and a transmittance of 22.6%.

In yet other embodiment, to the baseline construction outlined above, tuning layers 160 are associated with the second and third surfaces 112, 123. The tuning layer 160 associated with the second surface 112 is disposed in the first direction 101 relative electro-optic medium 130 and in the second direction 102 relative first electrode 140. Similarly, the tuning layer 160 associated with the third surface 123 is disposed in the second direction 120 relative electro-optic medium 130 and in the first direction 101 relative second electrode 150. Additionally, the tuning layers 160 are 3 nm thick layers of ruthenium. In such an embodiment, this construction may have an exterior reflectance of 11%, an interior reflectance of 11%, and a transmittance of 15.3%.

In yet other embodiment, to the baseline construction outlined above, a tuning layers 160 is associated with the second surface 112. Further, tuning layer 160 is disposed in the first direction 101 relative electro-optic medium 130 and in the second direction 102 relative first electrode 140. Additionally, the tuning layer 160 is a 2.0 nm thick layer of ruthenium. In such an embodiment, this construction may have an exterior reflectance of 7.7%, an interior reflectance of 12.6%, and a transmittance of 35.4%.

In yet other embodiment, to the baseline construction outlined above, tuning layers 160 are associated with the second and third surfaces 112, 123. The tuning layer 160 associated with the second surface 112 is disposed in the second direction 102 relative first substrate 110 and disposed in the first direction 101 relative first electrode 140. Similarly, the tuning layer 160 associated with the third surface 123 is disposed in the first direction 101 relative second substrate 120 and is disposed in the second direction 102 relative second electrode 150. Additionally, the tuning layers 160 are 1 nm thick layers of ruthenium. In such an embodiment, this construction may have an exterior reflectance of 10.2%, an interior reflectance of 10.2%, and a transmittance of 15.5%.

In a second example of window element 100, window element 100 has a first substrate 110, a second substrate 120, an electro-optic medium 130, a first electrode 140, a second electrode 150 a third substrate 210, a first coupling agent 220, a fourth substrate 230, and a second coupling agent 240. First substrate 110 comprises a first surface 111 and a second surface 112. The first surface 111 is disposed in a first direction 101 relative the second surface 112. Further, first substrate 110 is made of 1 mm thick clear glass. Second substrate 120 is disposed in a second direction 102, substantially parallel, and in a spaced apart relationship relative first substrate 110. The second direction 102 is substantially opposite the first direction 101. Additionally, second substrate 120 comprises a third surface 123 and a fourth surface 124. Third surface 123 is disposed in the first direction 101 relative fourth surface 124. Further, second substrate 120 is, likewise, made of 1 mm think clear glass. Electro-optic medium 130 is disposed between first substrate 110 and second substrate 120. Further, electro-optic medium 130 has a thickness of 500 microns. First electrode 140 is associated with second surface 112, between first substrate 110 and electro-optic medium 130. Further, first electrode 140 is made of 1 micron thick ITO. Second electrode 150 is associated with third surface 123, between second substrate 120 and electro-optic medium 130. Additionally, second electrode 150 is made of 1 micron thick ITO. Third substrate 210 is disposed in the first direction 101, substantially parallel, and in a spaced apart relationship relative first substrate 110. Additionally, third substrate 210 comprises a fifth surface 215 and a sixth surface 216. Fifth surface 215 is disposed in the first direction 101 relative sixth surface 216. Further, third substrate 210 is made of clear glass having a 1 mm thickness. First coupling agent 220 is disposed between first substrate 110 and third substrate 210. Additionally, first coupling agent is a 0.38 mm thick layer of EVA. Fourth substrate 230 is disposed in the second direction 102, substantially parallel, and in a spaced apart relationship relative second substrate 120. Additionally, fourth substrate 230 comprises a seventh surface 237 and an eighth surface 238. Seventh surface 237 is disposed in the first direction 101 relative eighth surface 238. Further, fourth substrate 230 is made of clear glass having a 1 mm thickness. Second coupling agent 240 is disposed between second substrate 120 and fourth substrate 230. Additionally, second coupling agent 240 is a 0.38 mm thick layer of EVA. This baseline construction may have an exterior reflectance of 9.6%, an interior reflectance of 10.2%, and a transmittance of 57.2%.

In some embodiments, to this baseline construction, outlined above, a tuning layer 160 is associated with the sixth surface 216. Further, tuning layer 160 is disposed in the second direction 102 relative third substrate 210 and in the first direction 101 relative the first coupling agent 220. Additionally, tuning layer 160 is a 3 nm thick layer of chrome. In such an embodiment, this construction may have an exterior reflectance of 9.6%, an interior reflectance of 10.6%, and a transmittance of 40.5%.

In other embodiments, to the baseline construction, outlined above, a tuning layer 160 is associated with the fourth surface 124. Further, tuning layer 160 is disposed in the second direction 102 relative second substrate 120 and the first direction 101 relative the second coupling agent 240. Additionally, tuning layer 160 is a 1.5 nm thick layer of chrome. In such an embodiment, this construction may have an exterior reflectance of 9.5%, an interior reflectance of 9.9%, and a transmittance of 43.9%.

In yet other embodiments, to the baseline construction, outlined above, tuning layers 160 are associated with the fourth and seventh surfaces 124, 237. The tuning layer 160 associated with the fourth surface 124 is disposed in the second direction 102 relative second substrate 120 and in the first direction 101 relative second coupling agent 240. Similarly, the tuning layer 160 associated with the seventh surface 237 is disposed in the first direction 101 relative fourth substrate 230 and in the second direction 102 relative second coupling agent 240. Additionally, the tuning layers 160 are 1.5 nm thick layers of chromium. In such an embodiment, this construction may have an exterior reflectance of 9.4%, an interior reflectance of 9.6%, and a transmittance of 33.7%.

In yet other embodiments, to the baseline construction, outlined above, tuning layers 160 are associated with sixth surface 216, first surface 111, fourth surface 124, and seventh surface 237. The tuning layer 160 associated with the sixth surface 216 is disposed in the second direction 102 relative third substrate 210 and in the first direction 101 relative the first coupling agent 220. The tuning layer 160 associated with the first surface 111 is disposed in the first direction 101 relative first substrate 110 and in second direction relative the first coupling agent 240. The tuning layer 160 associated with the fourth surface 124 is disposed in the second direction 102 relative second substrate 120 and the first direction 101 relative the second coupling agent 240. The tuning layer 160 associated with the seventh surface 237. Additionally, the tuning layers 160 are 1.5 nm. In such an embodiment, this construction may have an exterior reflectance of 8.6%, an interior reflectance of 9.7%, and a transmittance of 19.9%.

As used herein, the term "and/or," when used in a list of two or more items, means that any one of the listed items can be employed by itself, or any combination of the two or more of the listed items can be employed. For example, if a composition is described as containing components A, B, and/or C, the composition can contain A alone; B alone; C alone; A and B in combination; A and C in combination; A and C in combination; B and C in combination; or A, B, and C in combination.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

In this document, relational terms, such as "first," "second," and the like, are used solely to distinguish one entity or action from another entity or action, without necessarily requiring or implying any actual such relationship or order between such entities or actions.

The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The term "substantially," and variations thereof, will be understood by persons of ordinary skill in the art as describing a feature that is equal or approximately equal to a value or description. For example, a "substantially planar" surface is intended to denote a surface that is planar or approximately planar. Moreover, "substantially" is intended to denote that two values are equal or approximately equal. If there are uses of the term which are not clear to persons of ordinary skill in the art, given the context in which it is used, "substantially" may denote values within about 10% of each other, such as within about 5% of each other, or within about 2% of each other.

It is to be understood that although several embodiments are described in the present disclosure, numerous variations, alterations, transformations, and modifications may be understood by one skilled in the art, and the present disclosure is intended to encompass these variations, alterations, transformations, and modifications as within the scope of the appended claims, unless their language expressly states otherwise.

What is claimed is:

1. A window comprising:
    a first substrate having a first surface and a second surface, the first surface in a first direction relative the second surface;
    a second substrate having a third surface and a fourth surface, the second substrate disposed in a substantially parallel and spaced apart relationship in the second direction relative the first substrate, the second direction opposite the first direction, the third surface disposed in the first direction relative the fourth surface;
    a first electrode disposed in the second direction relative the first substrate;
    a second electrode disposed in the first direction relative the second substrate;
    an electro-optic medium disposed between the first electrode and the second electrode, the electro-optic medium operable to vary a transmittance of light therethrough; and
    a substantially transparent tuning layer operable to attenuate the transmittance of visible light therethrough, wherein the tuning layer is operable to attenuate the transmittance of visible light therethrough from between 70 and 45 percent, and wherein the tuning layer comprises ruthenium.

* * * * *